United States Patent [19]

Shiba

[11] Patent Number: 5,441,216

[45] Date of Patent: Aug. 15, 1995

[54] TAPE TAKE-UP HUB

[75] Inventor: Haruo Shiba, Komoro, Japan

[73] Assignee: TDK Corporation, Tokyo, Japan

[21] Appl. No.: 128,900

[22] Filed: Sep. 29, 1993

[30] Foreign Application Priority Data

Oct. 2, 1992 [JP] Japan .................................. 4-287079

[51] Int. Cl.6 ............................................. B65H 75/18
[52] U.S. Cl. ..................................................... 242/605
[58] Field of Search ........................................ 242/605

[56] References Cited

U.S. PATENT DOCUMENTS

| 4,081,151 | 3/1978 | Ender et al. | |
|---|---|---|---|
| 4,201,353 | 5/1980 | Schor . | |
| 4,280,670 | 7/1981 | Schor . | |
| 4,340,188 | 7/1982 | Derendorf et al. | |
| 4,341,357 | 7/1982 | De Filippo | 242/68.5 |
| 4,385,734 | 5/1983 | Shiba | 242/68.5 |
| 5,004,175 | 4/1991 | Lee | 242/68.5 |

FOREIGN PATENT DOCUMENTS 61-44316 12/1986 Japan .

*Primary Examiner*—John P. Darling
*Attorney, Agent, or Firm*—Wood, Phillips, VanSanten, Clark & Mortimer

[57] ABSTRACT

A tape take-up hub which comprises a circular ring having an outer wall surface on which a length of magnetic tape is taken up and an inner wall surface defining an opening with which the ring can fit onto a driving shaft and formed with three key ways adapted to mesh with keys formed on the driving shaft, said ring having a thickness substantially equal to the width of the magnetic tape, the improvement which further includes, as additionally formed on either side of the circular ring, three protrusions of the same height and three recesses of a depth greater than the height of the protrusions and adapted to receive the corresponding protrusions of an adjacent hub of an identical structure. The protrusions and recesses are equally spaced apart along one and the same circle and are aligned in position to those formed on the reverse side of the same circular ring.

5 Claims, 3 Drawing Sheets

F I G. 1
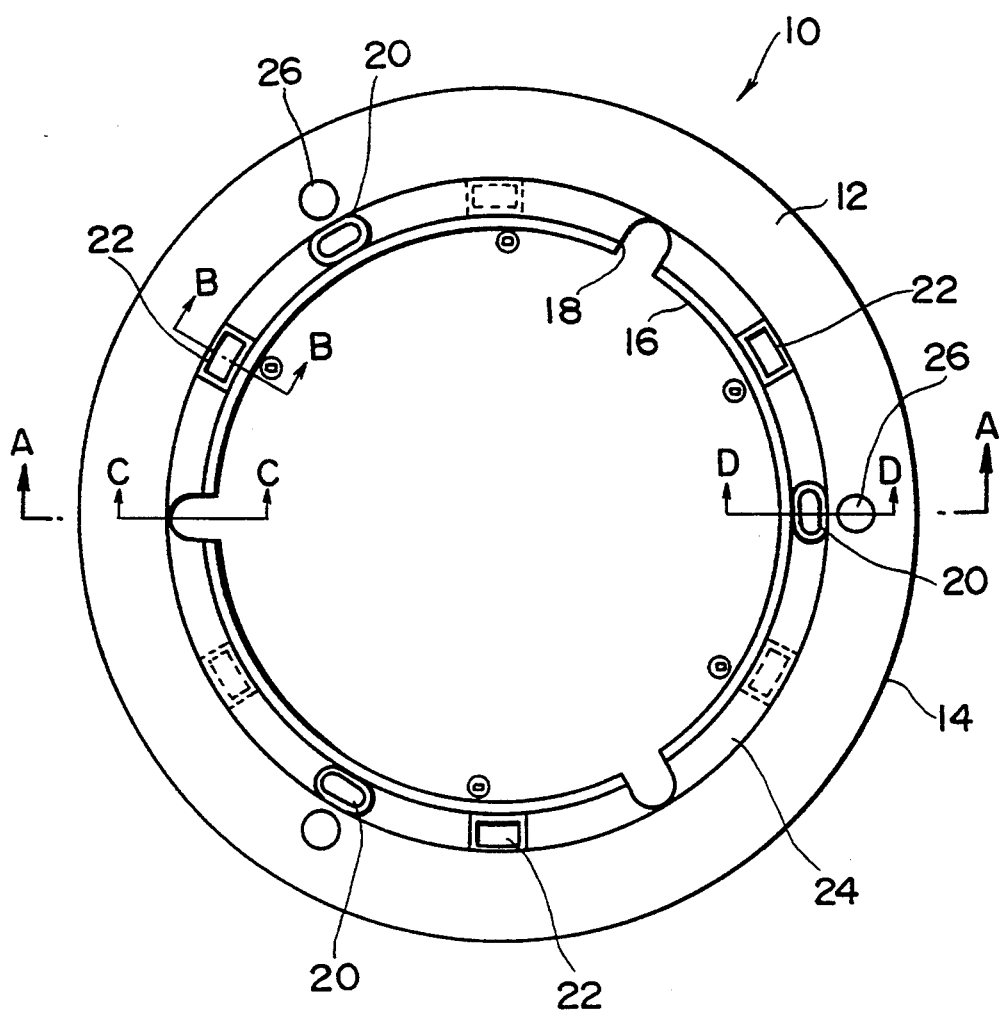
F I G. 2
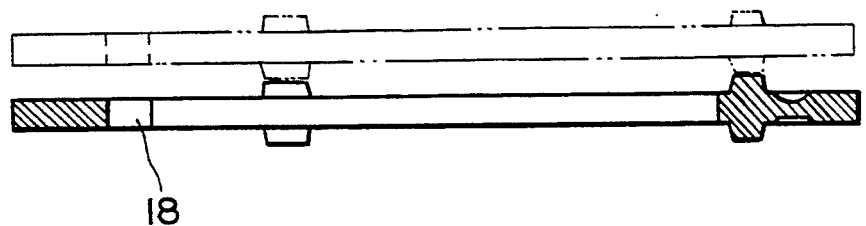

TAPE TAKE-UP HUB

BACKGROUND OF THE INVENTION

This invention relates to a hub for taking up a magnetic tape, for use in the slitting of magnetic film into widths of cassette tapes or open tapes.

When a broad film for magnetic tape is slitted into a plurality of tapes with widths for cassettes or open reels, the common practice is to wind the tapes on a plurality of flangeless take-up hubs mounted on a driving shaft. To keep the tapes out of contact, the take-up hubs during the winding operation must be disposed in a certain spaced relation.

The hubs laden with magnetic tape rolls are removed from the slitter and are either conveyed to the next station or stored temporarily. When the hubs are laid horizontally and stacked on one sides, gaps between the adjacent hubs and between their tape rolls can present a stepwise collapse problem of the tape rolls upon subjection to some external forces due to vibration, impact, etc. or because of their own weight.

Means for solving the problems are taught by Japanese Utility Model Application Publication No. 44316/1986, U.S. Pat. Nos. 4,081,151, 4,201,353, 4,280,670, etc. None of them are fully satisfactory because their advantages are more or less offset by their disadvantages. First, Utility Model Application Publication No. 44316/1986 discloses a hub whose circular ring, thicker than the width of a tape to be taken up is formed with large recesses in given portions on both sides and bumps or protrusions of a given height in portions diametrally opposite to the recesses so as to fit in the recesses of adjacent circular rings. The hub, therefore, is complex in shape and poorly symmetric. When adjacent hubs, in a stack with their protrusions in contact, are mounted on a driving shaft, the spacing is instable because of uneven spacer action. When the stack is demounted from the driving shaft and kept closer by fitting the protrusions in the recesses of the neighboring hubs, every other hub must be turned either way through an angle of 180 deg., in a cumbersome procedure. U.S. Pat. No. 4,081,151 introduces a hub whose circular ring has three recesses formed on one side with corresponding protrusions formed on the reverse side. Superposing a plurality of hubs in a stack brings their circular rings into close contact as the protrusions on one side are fitly engaged with the recesses on the other side of the next circular ring and so forth. However, since each hub is not identically shaped on both sides, the close-contact superposition is not accomplished unless all the hubs are oriented in the same direction.

U.S. Pat. Nos. 4,201,353 and 4,280,670 reveal hubs having the same configuration on both sides with good symmetry. Typical of them is a tape take-up hub which, as shown in FIG. 6, comprises a circular ring 7 having an outer wall surface 1 on which a length of magnetic tape is taken up and an inner wall surface 3 formed with eight key ways 5 adapted to mesh with keys formed on a driving shaft, the inner wall surface defining an opening with which the ring can fit onto the driving shaft, said ring having a thickness substantially equal to the width of the magnetic tape. The inner wall surface has also four protrusions 9 so formed as to fit in correspondingly shaped key ways of an adjacent hub of the identical structure. These protrusions 9 serve as spacers when a plurality of such hubs are mounted on the driving shaft of a slitter, with the protrusions 9 kept in contact with those of the next hub. When the hubs in a stack are removed from the driving shaft and caused to turn relative to one another, their protrusions 9 fit in the corresponding key ways 5, reducing the overall thickness of the stack.

However, the conventional hub shown in FIG. 6, with a number of key ways formed along the inner periphery of the circular ring has problems of inappropriate roundness, backlash upon mounting on the driving shaft of a slitter, and difficulty of smooth mounting, with consequently low efficiency of operation. Moreover, the protrusions whose dimensions are dictated by those of the key ways are necessarily reduced in area, whittling down the stability. The present invention is aimed at settling all these problems of the prior art.

SUMMARY OF THE INVENTION

The present invention concerns an improvement of a tape take-up hub which comprises a circular ring having an outer wall surface on which a length of magnetic tape is taken up and an inner wall surface defining an opening with which the ring can fit onto a driving shaft and formed with a plurality of, preferably three, key ways adapted to mesh with keys formed on the driving shaft, said ring having a thickness substantially equal to the width of the magnetic tape.

Under the invention, the circular ring has on either side a plurality of protrusions of the same height and a corresponding number of recesses of a depth greater than the height of the protrusions and adapted to receive the corresponding protrusions of an adjacent hub of an identical structure, said protrusions and recesses being equally spaced apart along one and the same circle, said protrusions being aligned in position to those formed on the reverse side of the same circular ring.

Whenever any key way is aligned to that of an adjacent hub, the protrusions always come in contact with those of the adjacent hub, providing a space twice the height of the protrusions between the neighboring circular rings. When a hub laden with tape is superposed with another hub of the identical structure, with the protrusions and recesses in engagement, their circular rings come in direct contact, precluding the possibility of steplike collapse of tapes during storage and transportation.

In addition, the roundness of the inner periphery of the circular ring is improved, facilitating smooth mounting of the hub on the driving shaft. The recesses and protrusions can be designed to have larger areas than before, independently of the key ways. This results in greater stability of the hub as mounted on the driving shaft.

BRIEF DESCRIPTION OF THE DRAWINGS

FIG. 1 is a plan view of a hub embodying the invention for taking up a magnetic tape;

FIG. 2 is a cross-sectional view taken on the line A—A of FIG. 1;

DESCRIPTION OF THE PREFERRED EMBODIMENT

Figure 3:
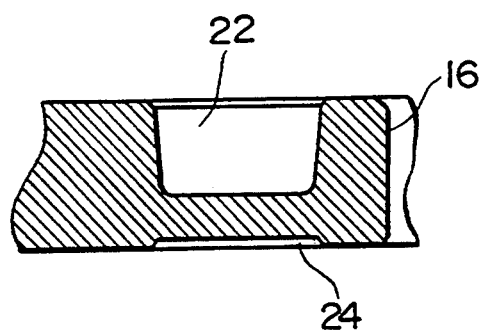
FIG. 3 is a cross-sectional view taken on the line B—B of FIG. 1.

An embodiment of the invention will now be described with reference to FIGS. 1 to 4. FIG. 1 is a plan view of the embodiment and FIGS. 2 to 5 are cross-sectional views taken on the lines A—A, B—B, C—C, and D—D, respectively, of FIG. 1.

A hub 10 for taking up a magnetic tape as slitted comprises a circular ring 12 of a thickness about equal to the width of the magnetic tape. Its outer wall surface 14 forms a supporting face on which the slitted magnetic tape is to be wound, while the center opening defined by its inner wall surface 16 has a diameter just large enough to receive a take-up driving shaft of the tape slitter. The inner wall surface 16 has three key ways 18 formed across the thickness of the circular ring 12 at equally-spaced points where they are engageable with keys of the driving shaft. On both sides of the circular ring 12 are formed flat protrusions 20 of the same height, numbering three for each side and equally spaced apart along an imaginary circle. The protrusions 20 on the two sides are in alignment. Along the same imaginary circle on which the protrusions are formed on each side, there are three equally spaced recesses 22 of a depth slightly greater than the height of the protrusions. These recesses 22 have shape and size adapted to engage the corresponding protrusions of another hub of the same structure to be superposed on this hub. The recesses 22 may be formed through, but blind recesses are preferred because it lessens the loss of mechanical strength. In the illustrated embodiment the protrusions 20 are elliptic and circumferentially longer than the key ways 18. For smooth engagement with the recesses 22 that are rectangularly shaped, the periphery of the top of each recess 20 is bevelled.

The protrusions 20 are positioned 60 deg. offset from the key ways 18. This offset allows the contact of projections on hubs of the same structure, when the hubs are placed side by side with one key way of one hub aligned to any key way of the other hub, regardless of which sides of the hubs face each other. The recesses 22 may be formed at any desired angular positions where they do not interfere with the protrusions 20 and key ways 18. In any case, however, they are each spaced a given angle apart from the corresponding protrusions in the same direction. Desirably, each recess is 30 deg. away from the corresponding protrusion 20 clockwise or counter-clockwise. Thus the hub geometry is identical on both sides and there is no need of telling which side is which.

Figure 4:
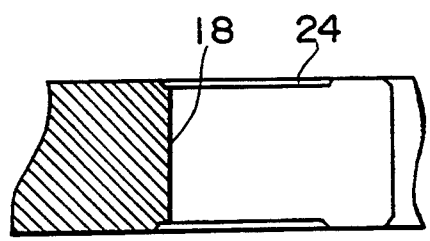
FIG. 4 is a cross-sectional view taken on the line C—C of FIG. 1.

Further, as shown in FIGS. 3 and 4, inner peripheral grooves 24 of a width slightly larger than that of the top of the protrusions 20 but of a very small depth are formed, one for each, on both sides of the circular ring 12. The peripheral grooves 24 serve as guides in fitting the projections into the recesses of superposed rings.

Figure 5:
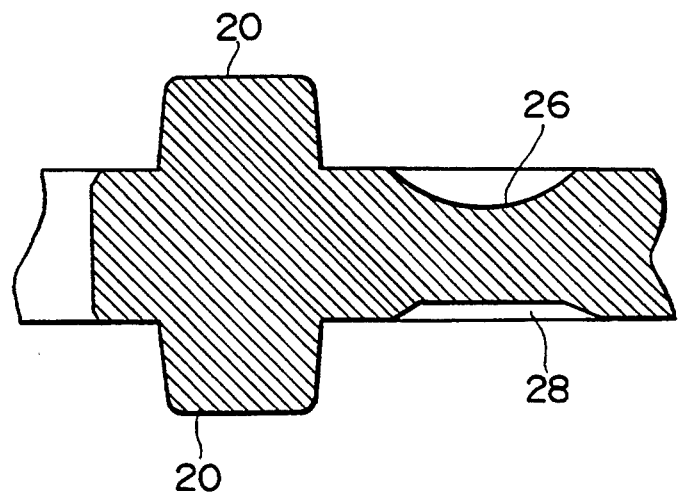
FIG. 5 is a cross-sectional view taken on the line D—D of FIG. 1.
Figure 6:
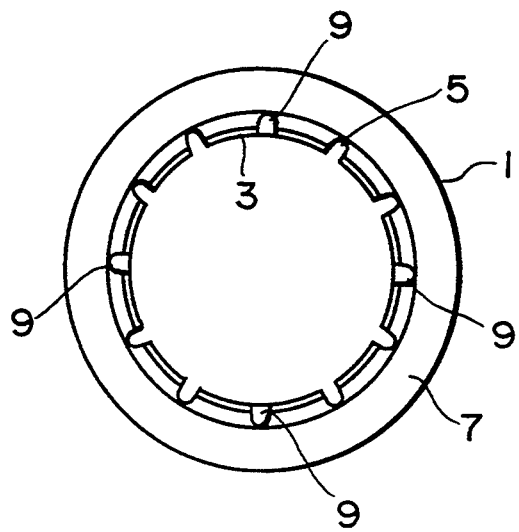
FIG. 6 is a plan view of a conventional hub for taking up a magnetic tape.

As FIG. 5 shows, three gates 26 formed in equally spaced relation with slight recesses formed as at 28 on the reverse side prevent the deformation with shrinkage on molding.

Before the material tape film is slitted, a plurality of tape take-up hubs 10 are provided and mounted on a driving shaft. Whenever any key way 18 is aligned to that of an adjacent hub, the protrusions 20 come in contact with those of the adjacent hub, thereby securing a space twice the height of the protrusions between the neighboring circular rings 12.

When slitted tapes have been wound on, the hubs are removed from the slitter and are turned relative to each other. The protrusions 20 are guided along the peripheral grooves 24 of the adjacent hubs into engagement with the recesses 22 of the other hubs, bringing the circular rings 12 into face-to-face contact. Depending on the turning direction the protrusions 20 slide over the key ways 18 of the other hubs, but because the protrusions are longer than the key ways, their engagement with the corresponding recesses are not hampered. Thus the direct contact of the flat protrusions 20 with those of the adjacent hubs avoids the steplike collapse of tapes during storage and transportation.

According to this invention, the circular ring 12 has fewer key ways 18, only three in all, than heretofore along the inner periphery 16. This ensures greater roundness and less backlash of the ring, and smoother mounting on the driving shaft. In addition, the recesses 22 and protrusions 20 can be designed to have larger areas than before, independently of the key ways 18. This results in greater stability of the hub as mounted on the driving shaft.

What is claimed is:

1. An improved take-up hub including a circular ring having an outer wall surface on which a length of magnetic tape is taken up and an inner wall surface defining an opening such that the ring can fit onto a driving shaft and formed with a plurality of key ways adapted to mesh with keys formed on a driving shaft, said ring having a thickness substantially equal to the width of the magnetic tape, wherein the improvement comprises: as additionally formed on either side of the circular ring, a plurality of protrusions of the same height, the same in number as the key ways, and a plurality of recesses, the same in number as the protrusions, with the plurality of recesses each being defined by an opening formed on one of the sides of the circular ring which does not open to the inner wall surface and a bottom surface and being of a depth greater than the height of the protrusions and adapted to receive the corresponding protrusions of an adjacent hub of an identical structure, said protrusions and recesses being equally spaced apart along one and the same circle, said protrusions being aligned in position to those formed on the reverse side of the circular ring.

2. The hub as claimed in claim 1 wherein said protrusions have a circumferential length greater than that of the key ways.

3. The hub according to claim 1 wherein the plurality of protrusions each has only one surface distal from the side of the ring on which the protrusion is formed, with the one surface having a uniform predetermined space over the entire extent of the one surface from said ring side such that the predetermined space is the same for each of the protrusions.

4. An improved tape take-up hub including a circular ring having an outer wall surface on which a length of magnetic tape is taken up and an inner wall surface defining an opening such that the ring can fit onto a driving shaft and formed with three key ways adapted to mesh with keys formed on a driving shaft, said ring having a thickness substantially equal to the width of the magnetic tape, wherein the improvement comprises: as additionally formed on either side of the circular ring, three protrusions of the same height and three recesses, with the recesses each being defined by an opening formed on one of the sides of the circular ring which does not open to the inner wall surface and a bottom surface, with the recesses being of a depth greater than the height of the protrusions and adapted to receive the corresponding protrusions of an adjacent hub of an identical structure, said protrusions and recesses being equally spaced apart along one and the same circle, said protrusions being aligned in position to those formed on the reverse side of the same circular ring.

5. An improved take-up hub including a circular ring having an outer wall surface on which a length of magnetic tape is taken up and an inner wall surface defining an opening such that the ring can fit onto a driving shaft and formed with a plurality of key ways adapted to mesh with keys formed on a driving shaft, said ring having a thickness substantially equal to the width of the magnetic tape, wherein the improvement comprises: as additionally formed on either side of the circular ring, a plurality of protrusions of the same height, the same in number as the key ways, and a plurality of recesses, the same in number as the protrusions, with the plurality of recesses each being defined by an opening formed on a side of the circular ring which does not open to the inner wall surface and a bottom of surface and being of a depth greater than the height of the protrusions and adapted to receive the corresponding protrusions of an adjacent hub of an identical structure, said protrusions and recesses being equally spaced apart along one and the same circle, said protrusions being aligned in position to those formed on the reverse side of the same circular ring, wherein said circular ring has on either side an inner peripheral groove of a depth shallower than the depth of said recesses in which said protrusions fit along one and the same circle.

* * * * *